United States Patent [19]

Robinson

[11] Patent Number: 5,751,450
[45] Date of Patent: May 12, 1998

[54] METHOD AND SYSTEM FOR MEASURING COLOR DIFFERENCE

[75] Inventor: David A. Robinson, Towcester, Great Britain

[73] Assignee: MEDAR, Inc., Farmington Hills, Mich.

[21] Appl. No.: 651,455

[22] Filed: May 22, 1996

[51] Int. Cl.⁶ .................................................. H04N 1/46
[52] U.S. Cl. .................................................. 358/504; 358/518
[58] Field of Search ................................ 358/504, 519, 358/520, 522, 530, 518; 395/131, 132; 382/167, 168; 345/153; 364/526

[56] References Cited

U.S. PATENT DOCUMENTS

| | | | |
|---|---|---|---|
| 4,414,635 | 11/1983 | Gast et al. | 364/526 |
| 4,653,014 | 3/1987 | Mikami et al. | 364/526 |
| 5,085,325 | 2/1992 | Jones et al. | 209/580 |
| 5,218,555 | 6/1993 | Komai et al. | 364/526 |
| 5,221,959 | 6/1993 | Ohyama et al. | 356/326 |
| 5,410,637 | 4/1995 | Kern et al. | 395/61 |
| 5,552,805 | 9/1996 | Alpher | 345/153 |

Primary Examiner—Thomas D. Lee
Assistant Examiner—Jerome Grant, II
Attorney, Agent, or Firm—Brooks & Kushman P.C.

[57] ABSTRACT

A method and system are provided for automatically and quantitatively measuring color difference between a color distribution of an object and a reference color image using "color distance" in a color system. A template representing the reference color image is stored in a memory of a machine vision system. The machine vision system generates a sample color image of the object and processes the template together with the sample color image to obtain a total color distance. Color distance may be measured either in a Euclidean or "City Block" fashion. Preferably, a look-up table stores the template. The color system may be either intensity dependent or independent. The total color distance can either be presented or displayed to an operator of the machine vision system or else can be used in an automatic feedback loop of a controller of a machine or process.

40 Claims, 1 Drawing Sheet

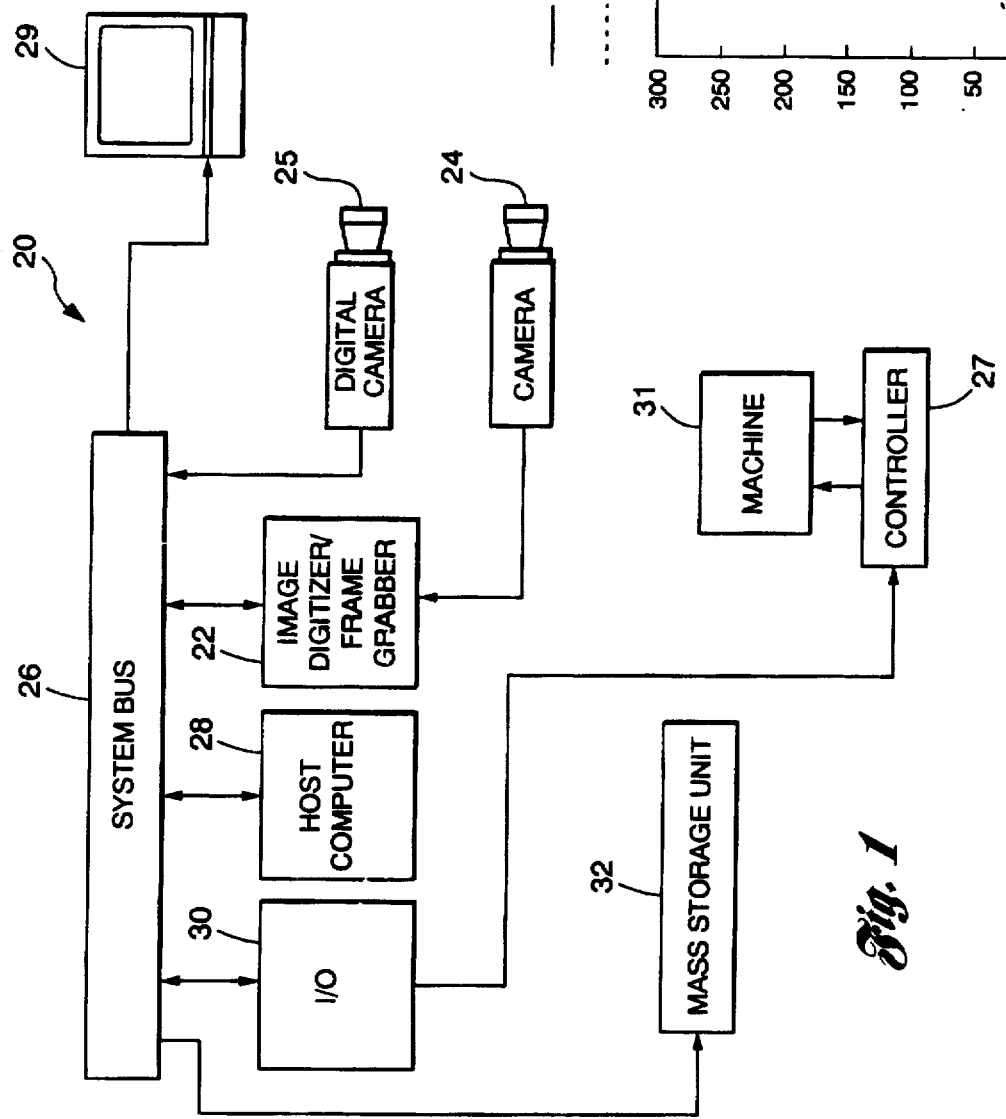

5,751,450

1

METHOD AND SYSTEM FOR MEASURING COLOR DIFFERENCE

CROSS-REFERENCE TO RELATED APPLICATIONS

This application is related to U.S. patent application Ser. No. 08/591,130 entitled "Method and System for Automatically Calibrating a Color Camera in a Machine Vision System" and to U.S. patent application Ser. No. 08/591,027 entitled "Method and System for Automatically Monitoring the Color of an Object at a Vision Station" both of which were filed on Jan. 25, 1996 and have the same assignee as the present application.

TECHNICAL FIELD

This invention relates to methods and systems for measuring color difference and, in particular, to method and systems for quantifying such color difference.

BACKGROUND ART

Until recently, measurement of color has been undertaken using spot measurement devices such as spectrophotometers and calorimeters. Invariably, these are precision devices and, other than specially engineered equipment, have not really been used for on-line color analysis. Invariably, they are limited to work on single color substrates, and because of their limited field of view have not really been suitable for operation on intricately patterned multicolored objects.

The use of a high quality color television camera as a precision color monitoring device has many shortcomings, most of which have been detailed in the above-noted related applications. These shortcomings include limited dynamic range, susceptibility to illumination and electronic noise, electronic drift, incorrect color balance set up, etc. However, such cameras do have one overriding attraction, and that is their ability to simultaneously measure the color distribution of in excess of 250,000 pixels in about 20 milliseconds or less, a feat that is all but impossible using standard colorimetric measurement tools. However, currently there is very little one can do with all of this data other than check that one color is identical with another, either on the same image or compared with a pre-stored template.

There are many application areas where it is desirable to be able to quantitatively measure the similarity/dissimilarity between the color distribution of a sample object and a reference color image. For example, a region of an image may need to be either compared, enhanced, isolated or removed from the rest of the image where its main distinguishing parameter is its color. Two types of filter may be needed, a color removal filter, whereby all colors similar to selected reference colors are removed from an image, and a complementary filter whereby all objects whose color is not similar to selected reference colors are removed from the image.

Another example is within a color search algorithm, whereby an image is scanned and objects within the image are to be identified based not only on their physical geometry, but also on their color distribution. This application differs significantly from normal correlation techniques which invariably only use the geometry of an object in order to form a match.

Such a color algorithm could, for example, be used to identify all resistors of a given value on a printed circuit board, by automatically using a built-in, resistor color code. Current correlation techniques can only be used to identify resistors and are unable to distinguish their value.

2

Still another example is within a color matching algorithm whereby a machine vision system can measure whether the color distribution of a sample object is within acceptable limits of a standard or reference color image.

U.S. Pat. No. 4,653,014 to Mitcami et al. discloses a process for preparing discrimination criteria for identifying colors in a color identifying system. A computer-based system attempts to automatically determine the best way in which to be able to distinguish between single color samples. The system must be shown the color which it is trying to identify. It will then automatically derive the optimum parameters with which to be able to differentiate samples of these colors. It describes a spot measuring instrument rather than an area measuring instrument. Its output is essentially digital, in as much as the output result is that a sample is identified as being identical to one of the original samples. There is no way of quantitatively measuring how close, or how far the sample is from the original reference.

U.S. Pat. No. 5,218,555 to Komai et al. discloses a method for judging a color difference using rules and fuzzy inference and apparatus therefor. The color matching system is totally based on "fuzzy logic" and "fuzzy inference" components within its algorithm.

U.S. Pat. No. 5,410,637 to Kern et al. discloses a color tolerancing system employing fuzzy logic. This technique appears to be designed for matching a single color sample. As with the Komai et al. patent, the algorithm is totally reliant on "fuzzy logic".

U.S. Pat. No. 5,085,325 to Jones et al. discloses a color sorting system and method. The system uses a polar coordinate color specification. An external look up table is used to perform an acceptance/rejection flag. Digitized video goes straight into the hardware-implemented look up table for real-time speed.

U.S. Pat. No. 5,221,959 to Ohyama et al. discloses a color discrimination data input apparatus. The system modifies the spectral content of the illumination on an object in order to obtain the optimum separation of several classes of object based on differences in spectral reflectance of the objects being classified.

SUMMARY OF THE INVENTION

An object of the present invention is to provide a method and system for quantitatively measuring the similarly/dissimilarity between the color distribution of a sample object and a reference color image in a machine vision system using a single parameter (i.e. color distance).

Another object of the present invention is to provide a method and system to not only directly compare identical colors but also compare nearly identical colors in a color independent fashion.

In carrying out the above objects and other objects of the present invention, a method is provided for automatically measuring color difference between color distribution of an object and a reference color image in a machine vision system having a memory. The method includes the step of storing a template in the memory of the machine vision system. The template represents the reference color image. The method also includes the steps of generating a sample color image of the object having the color distribution and processing the template and the sample color image together to obtain a total color distance. The total color distance represents a quantitative difference between the color distribution and the reference color image in a color system.

The advantages accruing to the method and system of the present invention are numerous. For example, the concept of color distance has many potential applications such as color comparison, color recognition, and color filtering—both color pass and color stop.

For example, suppose one wishes to compare two areas in an image, maybe two adjacent pixels, both of them red, with two identical areas perhaps held in computer memory. One can do this using the color distance concept, viz:

Distance1=|Hs1−Ht1|+|Ss1−St1|

Distance2=|Hs2−Ht2|+|Ss2−St2|

Here, Hs1 and Ss1 represent the Hue and Saturation, respectively, of the first red sample pixel. Ht1, and St1 represent the Hue and Saturation of the first red template pixel, while the second set represent the same parameters of the second area. If the sample images are exactly the same as the template images, then the two color distances go to zero. As they get further apart in color, the color distance increases. In other words, color distance provides an analog scale with which to measure the closeness in color of two images. If one wants to treat the two pixels as one composite image, one simply adds the two distances:

Total_Distance=Distance1+Distance2

However, if one changes the color of the second pixel in both the sample and the template to, for example, blue, so that one now has one red and one blue pixel, the result is absolutely identical. When the two images are identical, there is zero difference, and if the images start to diverge, the distance will start to get larger the further apart the sample is from the template.

What is applicable for two individual pixels is also applicable for complete images irrespective of their color complexity, providing the images are pixel matched. If the coloring between the sample and template are identical, then the overall distance is zero. This parameter (i.e., color distance) increases as the color difference between the sample and template diverge.

Similarly, with color filtering, because the color filter plane covers the complete color space, one can build as simple or as complicated a filter as required. It is not limited to passing or stopping just a single color. One can configure a filter that will stop a very particular shade of red, while simultaneously stopping everything that is, for example, between grass and pea green, and any magenta pixel.

Preferably, color distance is a single parameter whose value varies as a function of color similarity/dissimilarity between 0 and an upper value. A value of 0 indicates that two color distributions are identical as far as the machine vision system is concerned. The upper value indicates that the two distributions are completely dissimilar. Thus, the smaller the number—the closer the color distributions are.

Automatic single color comparison now becomes a simple matter of comparing the prestored reference color (i.e. template) of a template object with a sample color of an object. If the color distance between the two measurements fall within the standard deviation of a color range of the template, then the colors are assumed to be identical. If the color distance is larger than this amount, the object is rejected.

This technique is readily extended to multicolored objects. A target or sample image is first pixel/subpixel aligned with its pre-stored color reference image then the whole image can be checked irrespective of any color boundaries on the image. In other words, a single number can be computed that represents the difference in color between a reference image and sample image irrespective of how many colors are present in the images. If this distance is too great, the sample will be rejected, else it will pass muster.

Color recognition for operations such as automatic resistor color code determination can be put onto a firm theoretical basis where color targets can be associated to template colors on the least distance basis. Thus, even if the colors are not identical to those on which the system was trained, they can be identified on minimum distance basis, similar to that used in Shannon coding in communication theory.

Color distance-based algorithms produce powerful color filtering capabilities. In the simplest case, it provides a sound theoretical basis for extending the color "bandwidth" of a color filter. Using color distance it becomes possible to construct a filter that will pass/stop colors that are similar to the selected color. Thus, if the trained color belongs to an object that has a spread of color, then the filter can be safely trained on any typical area, and the filter pass/stop band broadened to take into account the spectral spread.

Color-based image segmentation, using distance-based techniques is possible by asking whether any uncertain pixel is more likely to belong to one trained object or another, or, of course, some other as yet unknown object.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic diagram of a machine vision system in which the method and system for measuring color difference of the present invention can be used; and FIG. 2 is a graph illustrating the difference between Euclidian and City Block "color distance."

BEST MODE FOR CARRYNG OUT THE INVENTION

In general, this invention compares a sample or target image, captured from a sample object with a previously generated "known good" template or reference image. In this way, the method and system of the present invention quantitatively measures color difference. The results of the comparison can either be presented or displayed to an operator or else used in an automatic feedback loop to control a machine, a robot or a process or quality control.

Referring now to the drawing Figures, there is illustrated schematically in FIG. 1, a machine vision system, generally indicated at 20, by which the method and system of the present invention can automatically measure color difference between a sample color distribution of an object and a reference color image represented by a template. The machine vision system 20 typically includes an image digitizer/frame grabber 22. The image digitizer/frame grabber 22 samples and digitizes input images from an image source such as a sensor or color camera 24 and places each input image into a frame buffer having picture elements. Each of the picture elements may consist of three 8-bit numbers representing the brightness of that spot in red, green and blue regions of the spectrum in the image. A digital camera 25 coupled to a system bus 26 may be provided to eliminate the need for the image digitizer/frame grabber 22.

The system 20 also includes input/output circuits 30 to allow the system 20 to communicate with external devices such as a controller 27 for controlling a process or machine such as a machine 31.

The camera 24 may be an image source such as an analog, digital or line scan camera such as RS-170, CCIR, NTSC and PAL.

The system bus 26 may be either a PCI, an EISA, ISA or VL system bus or any other standard bus.

The image digitizer/frame grabber 22 may be a conventional three channel color frame grabber board such as that manufactured by Imaging Technologies, or other frame grabber manufacturers. Alternatively, the image digitizer/frame grabber 22 may comprise a vision processor board such as made by Cognex.

The machine vision system 20 may be programmed from a mass storage unit 32 to include custom controls for image processing and image analysis. Examples of image processing may include linear and non-linear enhancement, morphology, color and image arithmetic. Also, image analysis may include search, edge, caliper, blob, template, color, 2-D and 3-D measurements.

A signal processor or computer 28 of the system 20 may be a Pentium-based IBM compatible PC or other PC having a sufficient amount of RAM and hard disk space for performing the algorithms associated with the present invention.

Color Distance

"Color distance" is a method of quantifying the difference between two colors or color distributions. Color distance is a way to handle a gentle color gradient from one hue to another during a color filtering operation. However, color distance also represents a key concept in many color-based applications.

Color distance, as defined in the present application, is a relative measurement of the similarity of two colors or color distributions. It can be used in conjunction with virtually any color measurement system, such as RGB, IHS, etc. although it really shows its flexibility when used in conjunction with the intensity normalized color parameters such as REDNESS/GREENESS or Hue and Saturation. There are two different forms of the color distance. The first of which is the so-called Euclidean distance in which the distance is given by:

$$\text{Distance} = \sqrt{(rRef - rS)^2 + (gRef - gS)^2}$$

Here, the distance is computed in the REDNESS/GREENESS color system, and rRef is the REDNESS of the reference color and rS is the REDNESS of the comparison pixel. gRef and gS are the corresponding GREENESS parameters. The equation is of identical form for other two parameter color specifiers. For intensity dependent measures the equation would be extended in the following manner:

$$\text{Distance} = \sqrt{(iRef - iS)^2 + (hRef - hS)^2 + (sRef + sS)^2}$$

Here, iRef is the intensity of the reference pixel, and iS is the intensity of the sample pixel, the h and s components are the hue and saturation quantities respectively. RGB would be handled in an identical form being the square root of the sum of the squares of the RGB differences.

In this form its statistical pedigree can be recognized in the form for the accumulated or total distance; viz.:

$$\text{Distance} = \frac{1}{N} \sum_n \sqrt{(\bar{x} - x)^2}$$

Here, it can be seen to be almost identical in form to the standard deviation equation for finding the variability of a sample of x about a reference value. From which it can be inferred that the measurement is ideally suited for measuring the difference between color samples; setting up color confidence limits, etc.

The most rapid method of calculating the Euclidean distance is via a look-up table. If the color is defined in an intensity independent system, such as REDNESS/GREENESS then the input color can be completely defined by two bytes. These 16 bits can be used as a index into a 64K look-up table, producing an 8 bit distance measure. Such a methodology is only really practical when a large number of distances are to be computed from the same reference color. Once this reference color has been identified, the look-up table can be computed and from this stage distance, calculations are as fast as they can be. An example of where such a technique may be useful is color filtering where a particular single hue has been selected as the filter reference. Once this is known, the look-up table can be processed, and then used for subsequent arithmetic operations. However, operations such as the "resistor" matching problem where the distance is being computed with a different reference hue for each pixel, the look-up table technique may not be a viable option.

The second option for computing a color distance is related to the Euclidean distance, but does not share its statistical pedigree. The distance metric is known as "CITY BLOCK" distance, and is calculated by:

$$\text{Distance} = |rRef - rs| + |gRef - gs|$$

The variables are the same values as discussed previously, and the metric can be extended in an analogous way to cover intensity dependent color systems. The differences between the two are shown in the graph of FIG. 2.

It can be seen that the two distance measures both start off from the same place and end in the same place. However, in between, the City Block metric provides a consistently higher reading than the Euclidean metric. However, providing that one is consistent in which one is used, then in almost all applications where the distance is used as either a threshold or a comparison level then both will work just as well. The City Block is very much simpler and hence a great deal faster than that required for Euclidean distance, even when one is using a look-up table methodology. It is still faster in computing the look-up table to start with.

City Block distance does appear to have a slight problem when used in a Template creation mode. Here, several images are combined to form a mean image, together with a distance measure of how the colors vary between the individual template samples. This provides information regarding the spatial variability of the color distribution between acceptable template samples; and is of crucial importance when using the difference metric as an acceptance criterion. If the distances found between the sample and mean template are similar to those found between template samples, then the sample can be accepted. If the distance measures are greater, it fails.

The problem arises during the formation of the template. Say the mean template is to be formed by observing 16 template samples. One needs two parameters per pixel. The first is the mean value over the 16 samples; the second is the distance variation over the 16 samples. The distance scatter is derived from the distance between the population mean, and the individual values. With the Euclidean distance it is possible to formulate the equations such that both the mean and the number required to obtain the scatter can be accomplished during one pass. With respect to City Block distance, one may need to keep all 16 images in memory while the mean was computed, so that the mean could be used to compute the City Block scatter.

Color Comparison Methodology

This section describes the algorithm required to use color distance as a basic quality control for matching colors.

It should be noted that although the example shows its application to a single color target, subject to the target being pixel matched to the template, the color, or spread of colors is irrelevant.

Generation of Original Template

The original template can be made in virtually any color system, from intensity dependent formats such as RGB to intensity independent formats such as REDNESS/GREENESS. Concentrating on the latter to focus the discussion, an image is taken of a Template object, and converted into a REDNESS and a GREENESS image. Here, REDNESS is defined as the function:

$$REDNESS(r,g,b) = \frac{255 \cdot r}{\sqrt{r^2 + g^2 + b^2}}$$

and GREENESS is defined as:

$$GREENESS(r,g,b) = \frac{255 \cdot g}{\sqrt{r^2 + g^2 + b^2}}$$

In the situation where the template is being manufactured from multiple images, two parameters need to be derived. The first is the mean template images. These can be determined simply by adding the sample templates together and then dividing by the number of samples in the template viz.

$$Mean\_image_{row,column} = \frac{1}{N} \cdot \sum_n Current\_pixel_{row,column}$$

The mean template will consist of two monochrome images, the mean REDNESS image and the mean GREENESS image.

The second parameter to be obtained is the intrinsic color distance variation within the sample templates themselves. The overall outcome will be to produce a distance map of the template, such that areas of high color variation on a sample-per-sample basis will end up with a high color distance variance. Consequently, on use as a template, areas with a high color variance can be made less selective than areas of stable colorness. This is accomplished on a running basis. After the initial template image has been taken, the template variance image is cleared to zero. Then as each subsequent template image is acquired, the distance between the current pixel on the previous image is measured, and added into the distance image. After this has been done for the whole template batch, the resulting distance image is divided by the number of templates minus 1. Thus, each pixel in the template image has an associated average distance broadly related to the variability of that pixel during the template acquisition.

$$Template\_distance_{row,column} = Template\_distance_{row,column} +$$

$$\left[ \begin{array}{l} \sum_n |rPrevious\_pixel_{row,column} - rCurrent\_pixel_{row,column}| \ldots \\ + |gPrevious\_pixel_{row,column} - gCurrent\_pixel_{row,column}| \end{array} \right]$$

Here, rPrevious_pixel is the current pixel in the REDNESS image of the previous template image, and rCurrent_pixel is the current pixel in the REDNESS image of the latest template image, the corresponding "g" prefix variables are the corresponding pixel in the GREENESS image.

Color Testing

In order to undertake color tests, a segment of the current image corresponding to the template is acquired. This can be registered with the template using search tools, if this is necessary. The incoming image will be disassociated into its colorness components. Following the previous example, this will be a two plane image consisting of REDNESS and GREENESS. The color distance comparison will be undertaken on a pixel-by-pixel basis but note that areas corresponding to areas of high spatial variance can be excluded from the computation. Thus, the resulting match coefficient can be limited to known stable image areas. If we,assume that we produce a binary mask image directly from the spatial standard deviation such that regions whose intensity is "0" are disallowed due to the instability of the image contents, and "1" in areas corresponding to stable areas, then there are two types of measurement one can undertake.

The first measurement is a non-qualified measurement, as might be undertaken in a simple color comparison as discussed earlier. Here, the overall or total color distance is accumulated over the complete valid image (corresponding to "1" on the standard deviation mask). This would be accomplished using the following equation:

$$Accumulated\_distance = \sum_{row=0}^{height} \sum_{column=0}^{width}$$

$$\left( \begin{array}{l} |rTemplate_{row,column} - rSample_{row,column}| \ldots \\ + |gTemplate_{row,column} - gSample_{row,column}| \end{array} \right) \cdot Threshold_{row,column}$$

Here, rTemplate is the current pixel in the REDNESS image of the template, rSample is the corresponding pixel in the image being tested. The "g" prefix variables are the corresponding pixels in the GREENESS image. Threshold is the binary mask image. When comparing the sample image with a number of templates corresponding to different "objects" then the one exhibiting the lowest distance is the template that most closely matches the current image.

The second measurement is a qualified measurement. Here a single plane monochrome image is produced whose amplitude/intensity is simply the distance between the sample and template image at that point. This image can then be compared pixel-by-pixel to the corresponding template distance image. Subject to the distances between the sample and template being smaller than those computed during the template training session, then it is safe to assume that the sample belongs to the class typified by the template; else it can be safely rejected. The algorithm is shown below:

```
Failflag = FALSE
Failpix = [(|rTemplate_mean_{r,c} - rSample_{r,c}| +
|gTemplate_mean_{r,c} - gSample_{r,c}|) > σTemplate_{r,c}]
Failflag = Failflag||Failpix
```

In essence, the failflag is initially set so that the comparison passes. A binary image is produced by scanning both the mean template image and the sample image. The distance between the two are calculated on a per pixel basis (although the equation shows City Block, it could equally well be Euclidean distance). The resulting value is compared with the inherent template distance variability. If it is larger, the failure pixel is set else it is left clear. The value of the pixel is logically ORed with the fail flag. At the end of the scan we are left with a binary map showing the areas that have failed, and a single Fail-flag indicating if any of the pixels are out of specification.

Color Filtering Using Distance-Based Techniques

Two distinct forms of color filtering are recognized, the first is color removal. Color removal produces a colored image, in which all colors are present with the exception of hues that have been selected for removal. These will be replaced with black. (Note that they could in principle be replaced with any color, for example all Red pixels could be replaced by Blue if such an operation has any practical application, e.g., Chroma keying). Color adding starts with a completely black image, with the exception of any hues that have been selected for addition. In both these cases the spatial and color distribution of the image is left undisturbed. Addition of colors whilst the system is in removal mode is limited to colors that have been previously selected for removal. Similarly, removal of any colors whilst in color addition mode will be limited to colors that have previously been selected for addition. That is to say, it is meaningless to remove a color that is not present. Similarly, it is nonsense to add a color that is already present.

A Color List

Key to the operation of the color filter is a color list. This is in the form of a linked list. Taking for example the case of the color addition process, at initialization, the color filter is set to block all colors. The color list is empty. Any attempt to refresh the filter will result in exactly the same condition being returned. On selecting a color to be added to the filter, it gets added to the linked list in the form of the two color parameters specifying the color (which of course depends on the color system being selected such as hue/saturation or REDNESS/GREENESS etc.), together with a pointer to the previous top color. The last color pointer will simply contain a NULL. Refreshing the filter sequentially works its way down the list, from the top appending any color present to an original blank filter. As stated earlier, removal of any color whilst in this mode is limited to the colors that had previously been added. The user will be presented with a color panel, created simply by scanning down the linked list, and drawing a color patch with the corresponding color coordinates of each of the list entries. When one is selected, the linked list is modified so that the pointer entry to the color above the one to be removed is modified to point to the color entry below the removed color. On the next filter refresh operation, the filter will now be rebuilt without the removed entry. Operation of the color removal mode is exactly identical to the mechanism described above; with the exception that the action of the filter is complementary.

A Color Addition Filter

The structure of a color addition filter is in the form of a two dimensional array, whose x and y axes correspond to the colorness coefficients, such as hue and saturation, or REDNESS and GREENESS. In the case of hue and saturation all entries within the array correspond to valid colors, whereas for the REDNESS and GREENESS colorness coefficients, the only physically realizable colors correspond to a circular quadrant centered at the top left hand corner, and perfectly fitting the array. Points outside this quadrant, such as a color with a full scale REDNESS and a full scale GREENESS do not exist. The maximum value for both REDNESS and GREENESS occur at a value where both coefficients equal 0.7071*full scale, which corresponds to yellow.

Effectively, the color filter plane starts off at full scale. This indicates that all colors are as far away from the pass bands as can be obtained, consequently if this filter is used, every color gets stopped. If some entries are made on the color list and the filter is refreshed, the system undertakes the following operations. The x, and y coordinates of the filter represent color coefficients. Thus, scanning the x and y direction of the filter plane is equivalent to scanning the whole of the color space. For each location in the filter array, the color distance between the current list entry and the filter array is computed. (In operation it makes no difference whether the distance is expressed in Euclidean or City Block). The resulting distance is compared with the distance currently existing at that point. If the existing distance is higher than the current value, as it will be on the first list value, then the array value will be updated using the new distance. If the existing value is lower than the new value, as could be the case where a previous list entry has been processed which was closer to the point than the current list entry, then the value is left standing. This process is repeated until all of the entries in the color list have been processed.

$$Filter\_Entry_{x,y} = \min \left( \left( \frac{|x - rList\_Color| + |y - gList\_Color|}{Filter\_Entry_{x,y}} \right) \right)$$

The filter is now ready to use.

To use the filter, the original image is first scanned in x and y. The RGB components of the current pixel are used to compute its colorness coefficients, in whatever system is currently being used. These colorness values are then used as an index into the filter array. The resulting number is a distance measurement. This value is then compared to a threshold value controlling the width of the filter. If the retrieved distance is less than the threshold, then the pixel is passed on to the display unmodified else currently it is replaced by a zero pixel which appears black on the screen. The resulting image will only contain colors that are similar to the colors entered into the list, the degree of similarity being controlled by the threshold value.

A Color Subtraction Filter

The structure of a color subtraction filter is in the form of a two dimensional array, whose x and y axes correspond to the colorness coefficients, such as hue and saturation, or REDNESS and GREENESS. In the case of hue and saturation all entries within the array correspond to valid colors, whereas for the other colorness coefficients, the only physically realizable colors correspond to a circular quadrant centered at the top left hand corner, and perfectly fitting the array. Points outside this quadrant, such as a color with a full scale REDNESS and a full scale GREENESS do not exist. The maximum value for both REDNESS and GREENESS occur at a value where both coefficients equal 0.7071*full scale, which corresponds to yellow.

Effectively, this color filter plane starts off at full scale. This indicates that all colors are within the pass bands, consequently if this filter is used, every color gets passed. If some entries are made on the color list and the filter is refreshed, the system undertakes the following operations. The x and y coordinates of the filter represent color coefficients. Thus, scanning the x and y direction of the filter plane is equivalent to scanning the whole of the color space. For each location in the filter array, the color distance between the current list entry and the filter array is computed. (In operation it makes no difference whether the distance is expressed in Euclidean or City Block). The resulting distance is compared with the distance currently existing at that point. If the existing distance is higher than the current value, as it will be on the first list value, then the array value will be updated using the new distance. If the existing value is lower than the new value, as could be the case where a previous list entry has been processed which was closer to the point than the current list entry, then the value is left standing. This process is repeated until all of the entries in the color list have been processed.

$$\text{Filter\_Entry}_{x,y} = \min\left(\left(\frac{|x - r\text{List\_Color}| + |y - g\text{List\_Color}|}{\text{Filter\_Entry}_{x,y}}\right)\right)$$

The filter is now ready to use.

To use the filter, the original image is first scanned in x and y. The RGB components of the current pixel are used to compute its colorness coefficients, in whatever system is currently being used. These colorness values are then used as an index into the filter array. The resulting number is a distance measurement. This value is then compared to a threshold value controlling the width of the filter. If the retrieved distance is less than the threshold, then the pixel is replaced by a zero pixel which appears black on the screen or else it is passed on to the display unmodified. The resulting image will not contain any colors similar to the colors entered into the color list; the degree of similarity being controlled by the threshold value.

Color Comparison

Automatic color comparison is a simple matter of comparing the prestored reference colors or distribution of a template object with the color distribution of a sample object. If the color distance between the two measurements fall within the standard deviation of the color range of the template, then the colors are assumed to be identical. If the color distance is larger than this amount, the object is repeated.

Color Recognition

Color recognition for operations such as automatic resistor color code determination is put onto a firm theoretical basis where color targets can be associated to template colors on the least distance basis. Thus, even if the colors are not identical to those on which the system was trained, they can be identified on minimum distance basis, similar to that used in Shannon coding in communication theory.

While the best mode for carrying out the invention has been described in detail, those familiar with the art to which this invention relates will recognize various alternative designs and embodiments for practicing the invention as defined by the following claims.

What is claimed is:

1. A method for automatically measuring color difference between color distribution of an object and a reference color image of the object in a machine vision system having a memory, the method comprising the steps of:
   storing a template in the memory of the machine vision system, the template representing the reference color image of the object and having a first set of pixels;
   generating a sample color image of the object having the color distribution and having a second set of pixels; and
   processing the template and the sample color image together on a pixel-by-pixel basis to obtain a total color distance accumulated over matched pixels in the first and second sets of pixels in an area of the object, the total color distance representing a statistically meaningful color measurement between the color distribution and the reference color image of the object in a color system.

2. The method of claim 1 wherein the method further comprises the step of filtering the sample color image based on the total color distance.

3. The method of claim 2 wherein the sample color image includes a plurality of regions and wherein the step of filtering removes at least one region of the sample color image.

4. The method of claim 2 wherein the region of the sample color image is similar to a preselected hue or color.

5. The method of claim 1 further comprising the step of identifying the object based on the total color distance.

6. The method of claim 1 wherein the method further comprises the step of matching the color distribution of the object to the reference color image if the total color distance is within a predetermined, acceptable range.

7. The method as claimed in claim 1 further comprising the step of creating the template wherein the step of creating includes the step of generating the reference color image from a reference object having a reference color distribution.

8. The method as claimed in claim 7 including the step of converting the reference color image into two monochrome images.

9. The method as claimed in claim 7 wherein the step of creating includes the step of generating a plurality of reference color images.

10. The method as claimed in claim 9 wherein the step of creating includes the step of generating a mean template image including a plurality of pixels based on the plurality of reference color images, each of the pixels having a mean value and a distance value over the plurality of reference color images and wherein the template is based on the mean template image.

11. The method as claimed in claim 1 wherein the color system is intensive dependent.

12. The method as claimed in claim 1 wherein the color system is intensity independent.

13. The method as claimed in claim 1 further comprising the steps of providing a machine and adjusting the machine based on the total color distance.

14. The method as claimed in claim 13 wherein the step of adjusting is performed automatically.

15. The method as claimed in claim 1 wherein the template is based on a template image including a plurality of pixels, each of the pixels having a mean value and a distance value to define a color range.

16. The method as claimed in claim 1 wherein the quantitative distance is Euclidean distance.

17. The method as claimed in claim 1 wherein the quantitative distance is City Block distance.

18. The method as claimed in claim 1 wherein each of the first and second sets of pixels includes one or more pixels.

19. The method as claimed in claim 1 wherein the number of pixels in the first and second sets of pixels is substantially the same.

20. The method as claimed in claim 1 wherein the number of pixels in the first and second sets of pixels is different.

21. A color measuring system for automatically measuring color difference between a color distribution of an object and a reference color image of the object in a machine vision system, the system comprising:
   a memory for storing a template, the template representing the reference color image of the object and having a first set of pixels;
   means for generating a sample color image of the object having the color distribution and having a second set of pixels; and
   a processor for processing the template and the sample color image together on a pixel-by-pixel basis to obtain a total color distance accumulated over matched pixels in the first and second sets of pixels in an area of the object, the total color distance representing a statistically meaningful color measurement between the color distribution and the reference color image of the object in a color system.

22. The system as claimed in claim 21 further comprising a filter for filtering the sample color image based on the total color distance.

23. The system as claimed in claim 22 wherein the sample color image includes a plurality of regions and wherein the filter removes at least one region of the sample color image.

24. The system as claimed in claim 23 wherein the region of the sample color image is similar to a preselected hue or color.

25. The system as claimed in claim 21 wherein the system further comprises means for identifying the object based on the total color distance.

26. The system as claimed in claim 21 wherein the system further comprises means for matching the color distribution to the reference color image if the total color distance is within a predetermined, acceptable range.

27. The system as claimed in claim 21 further comprising means for creating the template wherein the means for creating the template includes means for generating the reference color image from a reference object having a reference color distribution.

28. The system as claimed in claim 27 including means for converting the reference color image into two monochrome images.

29. The system as claimed in claim 27 wherein the means for creating includes means for generating a plurality of reference color images.

30. The system as claimed in claim 29 wherein the means for creating includes means for generating a mean template image including a plurality of pixels based on the plurality of reference color images, each of the pixels having a mean value and a distance value over the plurality of reference color images and wherein the template is based on the mean template image.

31. The system as claimed in claim 21 wherein the color system is intensity dependent.

32. The system as claimed in claim 21 wherein the color system is intensity independent.

33. The system as claimed in claim 21 further comprising a machine and means for adjusting the machine based on the total color distance.

34. The system as claimed in claim 33 wherein the means for adjusting is a controller.

35. The system as claimed in claim 21 wherein the template is based on a template image having a plurality of pixels, each of the pixels having a mean value and a distance value to define a color range.

36. The system as claimed in claim 21 wherein the quantitative distance is Euclidean distance.

37. The system as claimed in claim 21 wherein the quantitative distance is City Block distance.

38. The method as claimed in claim 21 wherein each of the first and second sets of pixels includes one or more pixels.

39. The system as claimed in claim 21 wherein the number of pixels in the first and second sets of pixels is substantially the same.

40. The system as claimed in claim 21 wherein the number of pixels in the first and second sets of pixels is different.

* * * * *